April 17, 1962  F. H. RAYMOND ET AL  3,029,518
RELATIVE MOTION ELECTRICAL MEASURING APPARATUS
Filed Jan. 22, 1958   5 Sheets-Sheet 1
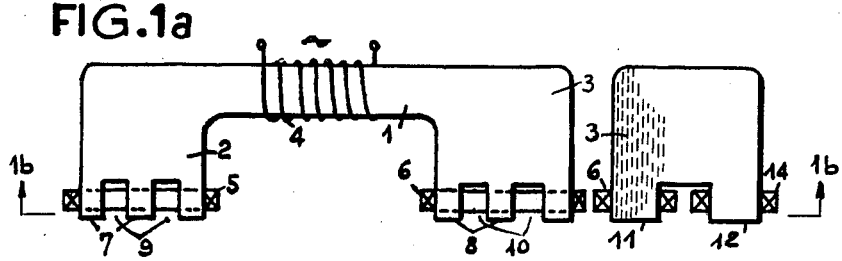
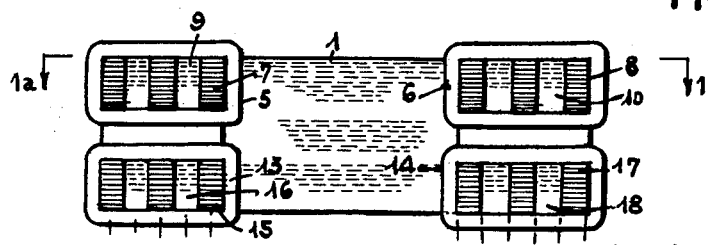
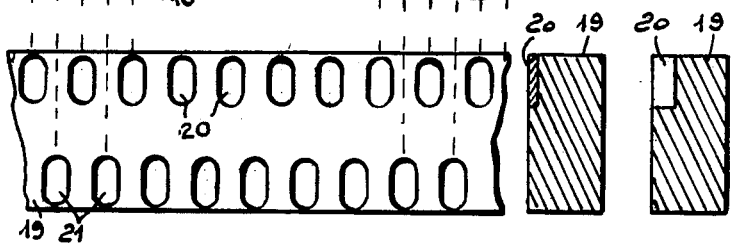
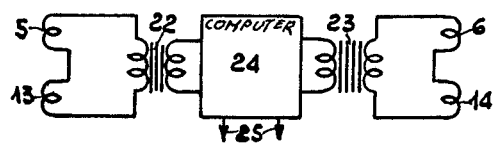
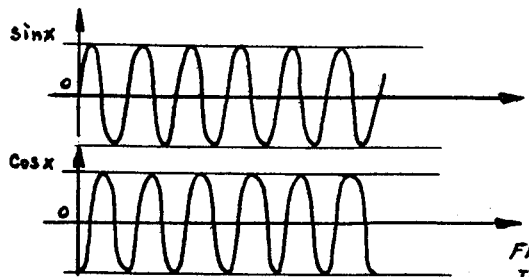
INVENTORS
FRANÇOIS HENRI RAYMOND
JACQUES HENRY-BAUDOT
BY
ATTORNEY April 17, 1962 F. H. RAYMOND ET AL 3,029,518
RELATIVE MOTION ELECTRICAL MEASURING APPARATUS
Filed Jan. 22, 1958 5 Sheets-Sheet 3

INVENTORS
FRANÇOIS HENRI RAYMOND
BY JACQUES HENRY-BAUDOT

ATTORNEY

April 17, 1962   F. H. RAYMOND ET AL   3,029,518
RELATIVE MOTION ELECTRICAL MEASURING APPARATUS
Filed Jan. 22, 1958   5 Sheets-Sheet 4
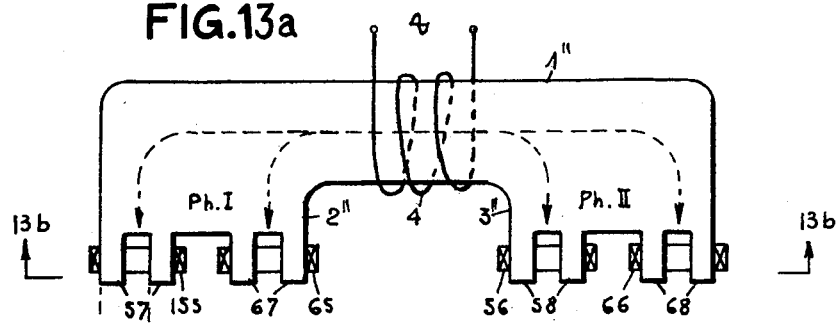
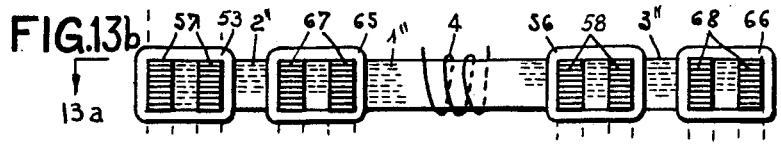
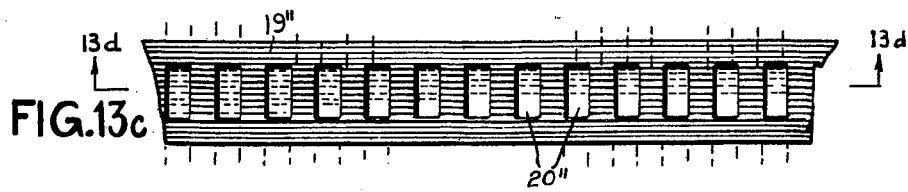
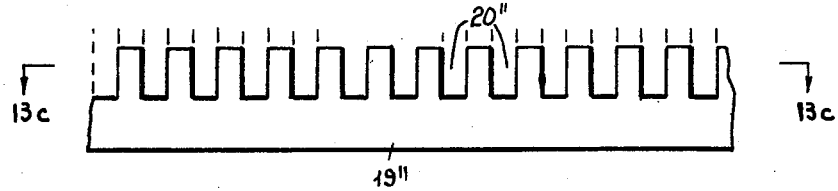
FIG.13d
INVENTOR.
FRANÇOIS HENRI RAYMOND
JACQUES HENRY-BAUDOT
BY
ATTORNEY April 17, 1962  F. H. RAYMOND ET AL  3,029,518
RELATIVE MOTION ELECTRICAL MEASURING APPARATUS
Filed Jan. 22, 1958  5 Sheets-Sheet 5
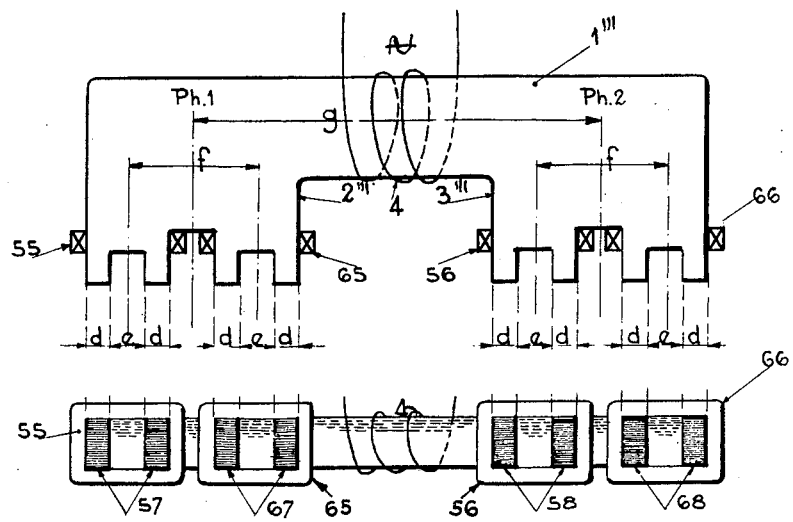
FIG.14a
FIG.14b
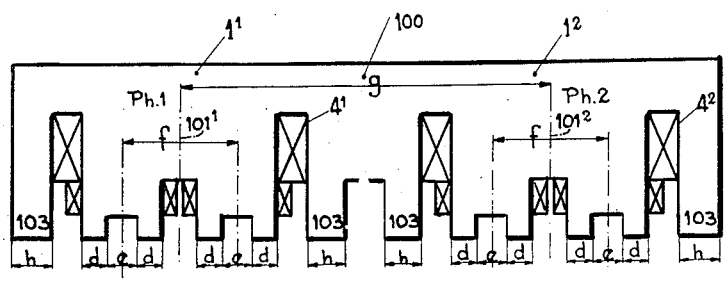
FIG.15a
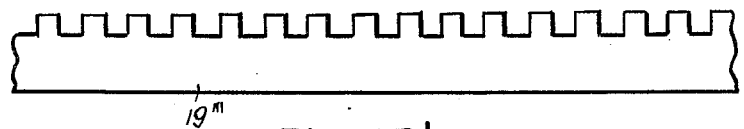
FIG.15b
INVENTOR.
FRANÇOIS HENRI RAYMOND
JACQUES HENRY-BAUDOT
BY
ATTORNEY

United States Patent Office 3,029,518
Patented Apr. 17, 1962

3,029,518
RELATIVE MOTION ELECTRICAL MEASURING
APPARATUS
François Henri Raymond, Saint-Germain-en-Laye, and
Jacques Henry-Baudot, Antony, France, assignors to
Société d'Electronique et d'Automatisme, Courbevoie,
France
Filed Jan. 22, 1958, Ser. No. 710,578
Claims priority, application France Jan. 25, 1957
23 Claims. (Cl. 33—125)

The present invention concerns improvements in/or relating to electrical apparatus for measuring the relative motion or displacement of two mechanical members, and more specifically an electrical measuring head attached to one mechanical member cooperating with an electrically responsive scale or scale bar attached to the other member.

One of the objects of the invention is to use this apparatus as a fine or accurate measuring device in automatic machine tool control systems which usually provide a coarse measure of such relative motion. Such control systems are well known per se and they are not an object of the invention.

A more specific object of the invention is to combine a scale of magnetic material and provided with at least one row of fine magnetic discontinuities, uniformly shaped and spaced, with a measuring head provided with at least one two-branch magnetic circuit driven by an alternating current winding; each branch has two sets of teeth bearing separate collector windings. These sets of teeth are relatively shifted by a fraction of one step of the magnetic scale as defined by its magnetic discontinuities. The branches are also relatively shifted by a fraction of that step. In this way the electrical currents in the collector windings while having substantially identical wave forms are shifted by predetermined phase shifts with respect to each other thereby determining the measure representative signal to be derived therefrom.

These and other objects of the invention will be more fully apparent from the drawings enclosed herewith in which—

FIGS. 1a, 1b, and 2 show side, end, and bottom views respectively of the measuring head of an apparatus embodying certain principles of the invention.

FIG. 3 shows a top view of the rule aligned with the bottom of the head of FIG. 1b to illustrate relative dimensions.

FIGS. 4 and 5 show different cross-sections of the scale of FIG. 3 corresponding to different embodiments of the magnetic discontinuities contained therein.

FIG. 6 illustrates a circuit diagram to exploit the currents obtained from the apparatus of FIGS. 1 to 5; and FIG. 7 illustrates wave forms of currents which may be observed therein.

Figure 8:
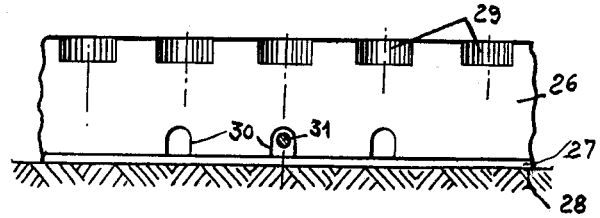
FIGS. 8 and 9 show side and top views respectively of a scale according to FIG. 5, in a preferred embodiment.

FIGS. 13a, 13b and 13c, 13d illustrate another embodiment of a measuring apparatus according to the invention. FIGS. 13a and 13b represent, respectively, the side and bottom views of a head, and FIGS. 13c and 13d, aligned therewith, the top and side views, respectively, of a corresponding scale.

FIGS. 14a and 14b show a further embodiment of a head in side and bottom views respectively.

FIG. 15a shows another preferred embodiment of a head, aligned with a scale shown in FIG. 15b.

In these drawings, actual dimensions are not shown in order not to obscure the representation. Furthermore, the teeth of the heads are shown in reduced number. In practice, the actual number is higher. On the other hand, certain relative positions between head and scale are preserved in order to clarify the function.

Referring first to FIGS. 1 to 5, the head of the measuring apparatus comprises a magnetic circuit consisting of a U-shaped laminated body 1 terminating in legs 2 and 3. This magnetic circuit is driven by an alternating current supplied to winding 4. Legs 2, 3 terminate in end portions 11 and 12 defined by slots in the direction of the relative motion and comprising groups of teeth, indicated at 7 and 15 for leg 2 and 8 and 17 for leg 3, respectively. As shown, there are three teeth in each group, defined by transverse grooves 9, 10, 16 and 18. Each tooth group is surrounded by a coil indicated at 5, 13 and 6, 14, for teeth 7, 15 and 8, 17, respectively. In this specification, the term "group" will be applied to a number of adjacent teeth which have their axes spaced apart an integral number of steps of the magnetic scale, and the term "set" will be applied to the teeth, or groups of teeth, which are enclosed by a common collector winding.

Head 1 is mechanically driven above, and in close proximity to magnetic scale 19 provided with magnetic discontinuities 20 and 21 uniformly spaced and arranged along two rows forming the steps of the scale. This step may be considered as being equal to the width of one discontinuity plus the width of an interval between two discontinuities, both widths being preferably made equal. One row of discontinuities is shifted with respect to the other by one-half of that step. Within head 1 the pairs 2 and 3 of tooth groups are shifted relative to each other by one-quarter step. The step thus defined is an elementary span of a measure, which repeats itself along the scale and is usually quite small, for instance, of the order of one millimeter (or a tenth of an inch). For instance, in case the three teeth 15 register with discontinuities 20 of magnetic scale 19, the magnetic flux through coil 13 is at its minimum while the magnetic flux through coil 5 is at maximum as teeth 7 then register with magnetic surfaces or areas of scale or rule 19 between discontinuities 21. In case, however, head 1 is displaced with respect to rule 19 or alternatively in case scale 19 is displaced with respect to head 1 with the same result, the magnetic fluxes will vary, and when the amount of displacement has reached one-half of a step of scale 19, the above conditions will be reversed. The same occurs at a quarter-step difference in displacement on the other leg of measuring head 1.

Since each leg 2, 3 is provided with a similarly related coil pair 5, 13, and 6, 14, respectively, coils 5, 13, 6 and 14 may be connected as shown for example in FIG. 6. The voltage collected at 22 is proportional to the scalar difference of the voltages induced within coil pair 5, 13. The voltage collected at 23 is proportional to the difference of those collected in coil pair 6, 14. For one step of displacement, each of the resulting voltages passes twice through zero. These voltages may be applied to computer 24 delivering at 25, through the composition of these voltages, a pulsating direct current signal representing the relative displacement between head 1 and scale 19.

For a shift equal to one-quarter of a step of measuring head 1 in the direction of scale 19, the voltages to be combined are in relative phase quadrature with respect to each other. When each voltage has a sinusoidal wave form, one may be considered as representing the variation of the sine of displacement X, i.e. sin X; the other will then represent the cosine of X, i.e. cos X. Functions from sin X and cos X, may be used as well known to derive a voltage representing X through an analog process.

FIG. 7 diagrammatically shows the ideal sin X and cos X wave forms of the currents or voltages derived from one pair of coils of head 1. The actual voltage of wave forms, of course, depend on the geometrical shape of teeth and magnetic discontinuities. A fair approximation of a sine wave form is obtained when each of the symmetrical discontinuities consists of two halves symmetrical with respect to the longitudinal axis of each row of discontinuities; each half of the discontinuity, in a cross section parallel to the top surface plane of the teeth, representing in profile the function sin X from 0° to 180° with said axis as the X axis; i.e. it approximates the 0°–180° half cycle of a sine curve.

Scale 19 may consist of magnetic material and magnetic discontinuities 20, 21 may consist of thin small slabs of non-magnetic electrically well conducting material. Such an arrangement is indicated in FIG. 4. The conducting material acts as a screen for the magnetic flux extending from and to head 1. Such screens, may be manufactured by several methods. For instance, slots may be formed in the magnetic material of the body of scale 19, and subsequently a mixture of powdered conducting metal and thermosetting or polymerizing resin, may be placed within these slots and hardened by the application of heat.

Alternatively, a so-called "printing" process may be employed for depositing conducting screens over a magnetic scale, and then powdered magnetic material may be used to fill the spaces between these screen deposits. Other known methods of making composite articles may be used without departing from the scope of the invention.

It will be noted however that when the magnetic discontinuities consist of magnetic screens, the operative frequency of the device must be maintained at a rather high value, for instance, of the order of 1 to 2 kc./s. On the other hand, frequently such devices must be operated at much lower frequencies for example at industrial and audio frequencies, such as from 50 to 1000 c./s. For such purposes preferably, according to a further feature of the invention, the magnetic screening effect is replaced by a change in reluctance of the magnetic circuits formed between the teeth of the head and the scale. Such change of reluctance may be obtained by providing in scale 9, as shown in the cross-section of FIG. 5, slots 20 of such depth that the voltages induced within the coils of head 1 will vary as stated above with the air gaps varying with relative displacements of head 1 and scale 19. The voltage will remain 180 degrees out of phase for the coils in each pair 5, 13 and 6, 14 and the resulting voltages will present the same features as stated above so that the final effect will remain the same as before. Obviously the wave form of the collected voltages is controlled by the shape of the cross-section of the slots in the plane of, and in any plane parallel to the surface of scale 19 over which head 1 is displaced.

The cooperating surfaces of scale 19 and head 1 must be as close as possible. Preferably these surfaces should bear against each other. This is quite feasible in case the magnetic discontinuities of scale 19 consist of slots. Stray magnetic flux is then considerably reduced and the results are in practice independent from the actual length of the scale.

It is apparent however that in certain cases, chiefly in machine tool applications, the length of the scale may be quite extensive, and the scale must be made of several abutting portions. The links between these portions must be such that they do not introduce any magnetic discontinuities from one to the next portion. However, scale 19 must be widened and provided with four parallel rows of discontinuities and, obviously, some additional shift must be provided between the teeth of head 1. Since the magnetic flux will circulate transversely within scale 19, scale 19 may then be easily extended by abutting the consecutive portions.

Figure 9:
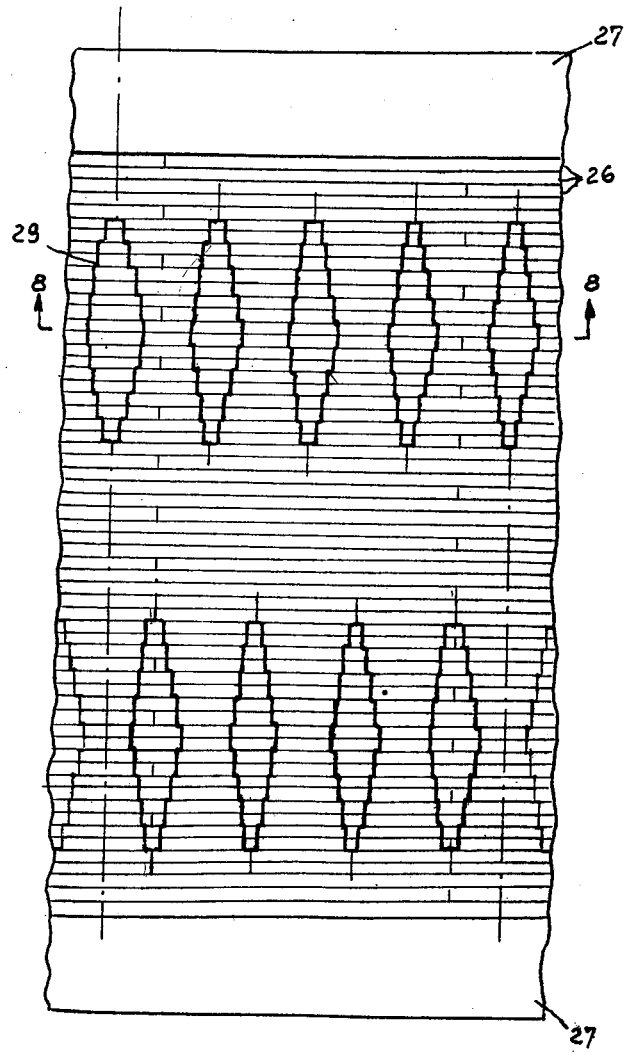

In order to avoid such a complex arrangement, it is further provided according to the invention, to form the scale of magnetic laminations 26 of substantially equal length which are imbricated and vertically arranged upon a channel insuring their position and attachment. Such an arrangement is shown in FIGS. 8 and 9. Channel 27 may be several yards long. It is carefully machined and rests upon a carefully planed surface 28, FIG. 8. Each magnetic lamination 26 is shorter in length than channel 27 and placed therein with its lower edge bearing on the bottom of channel 27. Along the length of channel 27, room for positioning broaches is provided. One broach is shown at 31 passing through slots 30 of lamination 26. Each lamination 26 has the same number of positioning slots 30 so that it may be placed in a desired position relative to the others, and selected from a corresponding number of shifting positions available. As a result, a general discontinuity will exist in any cross-section of the scale transverse to its length.

Laminations 26 are provided each at 29 at their upper edge with uniform indentations as shown in FIG. 8 and as further shown in the top view of FIG. 9. As apparent from FIG. 9 however, indentations 29 are not equal in size though of equal step, i.e. the spacing between vertical axes of the indentations is held constant. The width of the indentation slots themselves is so varied that when the assembly is made the depressions thus formed in the scale each present a geometrical area resembling or approximating that defined above for the purpose of obtaining a law of flux variation which is substantially a sine law.

Once the laminations 26 have been placed and positioned within channel 27, a final setting may be provided by means of a thermosetting resin poured into the assembly. After the setting of the resin, the outer surface of the scale is carefully planed.

This method of realizing the invention, however, involves the use of several profiles for the laminations 26 of scale 19. This may be simplified, according to a further feature of the invention, by using a single profile and adding certain spacing features to the various tooth sets of the cooperating head, which of course, facilitates design and manufacture.

Figure 11:
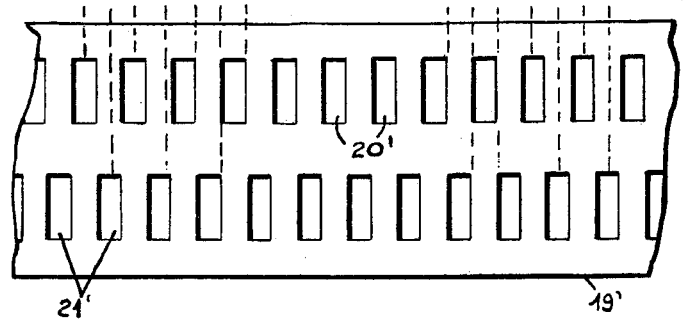

As shown in FIG. 11, accordingly, all the depressions 20', 21' in magnetic scale 19' consist of rectangular areas. While this does not change the manner of assembling the laminations, described with respect to FIGS. 8 and 9, the single lamination shape used for this new assembly, has teeth and intervals which are of uniform size and equal to one-half of the desired step.

In order to restore a quasi-sine variation of the magnetic flux, the structure of the tooth sets of the cooperating magnetic head has been modified as follows:

The intervals between the teeth of the head are varied according to a special law. As apparent, for example, from FIGS. 10 and 11, in each leg, the teeth of each set are distributed in two groups at various intervals, on opposite sides of a symmetry plane. The interval between the teeth terminating the two groups adjacent to that symmetry plane, is not one-half of the required step but, for example, increased by one-eighth of a step with respect to one-half of such step. This applies to interval 39 between the tooth groups 37 and 47, and also to interval 40 between the tooth groups 38 and 48. The same changes are applied to the two other tooth sets of the head in an obvious fashion. On the other hand, within each tooth group, the intervals between the teeth are maintained equal to one-half of the step.

Figure 12:
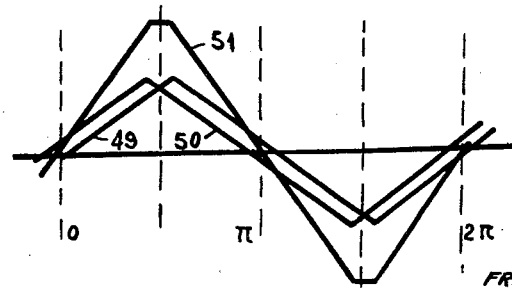
FIG. 12 illustrates the wave forms of currents obtained with the embodiment of FIGS. 10a, 10b and 11.

Consequently, the flux variation (above and below a mean value) collected by each group of teeth has the shape of a regular sawtooth, see FIG. 12. Sawtooth 49 relates to the tooth group 37 (or 38) and sawtooth 50 to tooth group 47 (or 48). The composite result of such flux variations has, sensed by coil 35 for the set of the two groups, the shape of a trapezoidal variation approximating a sine shape, and this approximation will suffice in most cases of practical use. The composite result similarly sensed by coil 36 will be the same except for a one-fourth step shift. The composite result of the two other magnetic fluxes, collected by coils 45 and 46 will be the same except for a one-half step shift with respect to those of coils 35 and 36, respectively.

A further simplification is provided, as illustrated in FIGS. 13 and 14, by reducing the scale to a single row of magnetic discontinuities arranged along its length, and by lengthening the magnetic head to a certain extent and arranging all the sets of teeth in series array instead of in parallel array as previously shown. It may be noticed that a spacing equal to one-half of a step, previously provided by double parallel tooth sets, may also be obtained by a series array of teeth sets with respect to the longitudinal dimension of the device.

As shown in FIGS. 13c and 13d, scale 19" has a single row of discontinuities 20". Magnetic head 1" of FIGS. 13a and 13b consists of a pile of elongated magnetic laminations having legs 2" and 3", each terminating in two groups of teeth 57, 67, and 56, 58, respectively. Each tooth group bears a separate collecting coil, 53, 65 and 56, 66, respectively. The drawing shows only two teeth for each tooth group but, of course, in actual practice this number is increased as previously stated.

Within each group, at least for the embodiment of FIGS. 13c and 13d, the teeth are spaced by one-half of a step of scale 19". In FIGS. 13a and 13b, leg 2" has tooth groups 57 and 67 spaced apart by an interval somewhat larger than an integer multiple of steps. The same applies to tooth groups 58 and 68 of leg 3" of head 1". Collecting coils 55, 56, 65 and 66 are interconnected in a similar manner as indicated in FIG. 6 for the corresponding windings of FIG. 1. The voltages collected from the tooth groups of this arrangement will have a certain phase shift. This is due to the tooth groups being displaced by a fraction of one-half of the step by proper machining as stated above.

With respect to rule 19" the two phases "Ph. 1" and "Ph. 2" of the alternating energization flux will be shifted by 90° (one-fourth step) with respect to each other. The operation will then resemble that described with respect to the graphs of FIGS. 7 and 12. The width of slots 20" in scale 19" may be slightly larger than one-half of the step, without affecting their uniform distribution along scale 19".

Figure 10A:
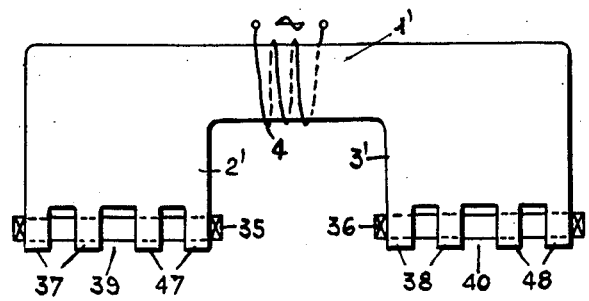
FIGS. 10a and 10b show side and bottom views of another head, and FIG. 11 aligned therewith represents the top view of a scale in this embodiment of the invention.
Figure 10B:
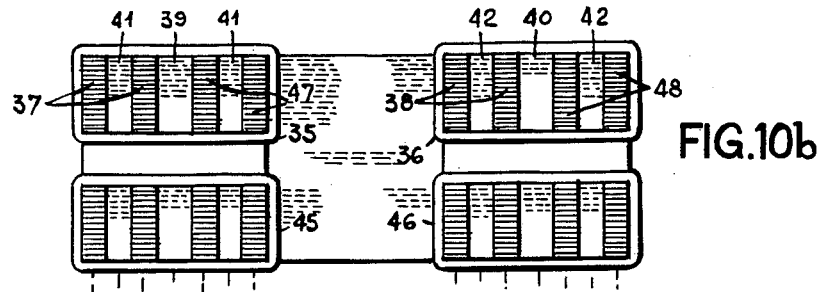

In FIGS. 14a and 14b, the relative shifts between the teeth of each tooth group strictly conform to those described with respect to FIGS. 10a and 10b, i.e. each tooth has a width equal to d, one-half of the step of scale 19". The spacing e between the two groups of teeth, here shown as of one tooth each, within a tooth set is equal to one-half of the step plus a fraction of a half step, and if there is more than one tooth in a group the interval between the teeth within each group is maintained at d (each group may comprise an equal number of teeth). The interval f between the symmetry planes of the tooth sets of each leg is made equal to an integer number of half steps plus a fraction of a half step. The spacing g between the symmetry planes of the legs is made equal to an integer multiple of steps plus one-half of a step. The magnetic flux in each tooth set will then correspond strictly to those shown in FIG. 12.

The devices of FIG. 13 and FIG. 14 with their series arrangement along the head of all tooth groups have a drawback. Due to the tooth groups forming part of a common magnetic flux circuit, a reaction flux appears which tends to disturb the inductor flux of energization winding 4. The resulting energizing flux is then slightly shifted with respect to the true flux. Consequently, an interaction occurs between the two elements of head 1 indicated at Ph. 1 and Ph. 2 and, as a result, the true zero of the measurement is slightly shifted towards a false zero. For a low driving frequency and rather low power, this drawback is not quite apparent, but it becomes substantial when either frequency or power consumption are increased.

In order to overcome such drawback, when required, according to the invention, the magnetic flux circuit of the measuring head is divided into two distinct parts. Each part is driven separately by an input winding, and the two parts are arranged strictly symmetrically with respect to the pair of tooth groups associated therewith. In this case, there are two distinct magnetic flux circuits which are not coupled with each other. The mechanical unity of the structure, of course, is preserved by a special cutting of the magnetic laminations forming the head (or alternatively by an appropriate mechanical mounting of the two separate head parts).

Such an arrangement is illustrated in FIGS. 15a and 15b where two separate magnetic flux circuits are shown at $1^1$ and $1^2$ with separate driving windings $4^1$ and $4^2$ placed within lamination slots formed symmetrically with respect to the longitudinal extension of circuits $1^1$ and $1^2$ respectively. Circuits $1^1$ and $1^2$ have symmetrical planes forming traces in FIG. 15a shown at $101^1$ and $101^2$. The mechanical unity of the head may be obtained by forming both circuits $1^1$ and $1^2$ by means of cutting the laminations in such a way as to provide a central portion 100 which does not play any part in the operation of the head. Furthermore, the laminations are so profiled that for each tooth set an additional branch 103 is formed, of a width in the scale direction substantially equal to the aggregate width of all the teeth of a tooth set. Branch 103 serves to close this tooth set by forming a separate magnetic flux circuit through that part of the scale cooperating with the head, as shown in FIG. 15b at 19'''. The profile of center part 100 of the laminations is so large that it has no effect on the operation of scale 19'''. The longitudinal dimensions are the same as in FIG. 14. The independence of the separate magnetic flux circuits is obvious. This applies to phases Ph. 1 and Ph. 2 and as well as to the tooth groups within each portion of the circuits. Thus the fidelity of response of such a magnetic head is practically ensured.

While in the foregoing, the invention has been applied to scales and heads formed for rectilinear translation, the invention may also be used for curvilinear scales. This involves simple and apparent modifications of the geometrical shapes of the members of a device according to the invention; it does not exceed the scope of this disclosure.

What is claimed is:

1. In an apparatus for electrically measuring the relative motion of two mechanical members, a measuring head attached to one of said members and a scale attached to the other of said members in close cooperation with said head, said scale comprising a body of magnetic material provided with at least one row of uniform magnetic discontinuities, and said measuring head comprising at least one magnetic flux circuit driven by an alternating current and provided with two legs, the legs having pairs of tooth sets and a collecting coil around each tooth set, the tooth sets within each leg differing in space phase relation relative to the discontinuities cooperating therewith, respectively, by a fraction of a step as defined by said discontinuities, and the sets of one leg collectively differing in space phase relation to said continuities from the sets of the other leg collectively by a fraction of a step, and pairs of said collecting coils being interconnected for producing a composite current derived from the tooth sets associated with said coil pairs.

2. Apparatus according to claim 1 wherein the scale consists of a bar formed of magnetic laminations, said head being movable along said bar and wherein said magnetic discontinuities consist of indentations along one edge of said laminations.

3. Apparatus according to claim 2 wherein said magnetic laminations are of equal length and are assembled relatively shifted from layer to layer so as to avoid at any cross-section a surface of discontinuity between sections of the scale bar.

4. Apparatus according to claim 1 wherein each magnetic discontinuity and each tooth in the plane in which they are facing each other has an area shaped as a rectangle, and wherein in each tooth set, the teeth are distributed in at least two groups of equal numbers of teeth; said groups spaced from each other by an interval equal to one-half step plus a fraction of a half step of the scale.

5. Apparatus according to claim 1 wherein the space phase difference between the tooth sets of the different legs amounts to an integer number of steps plus one-quarter of a step of the scale.

6. Apparatus according to claim 1 wherein the space phase difference between the tooth sets of the different legs amounts to an integer number of steps plus one-half of a step of the scale, and wherein the space phase difference of the tooth sets within each leg amounts to an integer number of half steps plus a fraction of a half step of the scale.

7. Apparatus according to claim 1 wherein the space phase difference of the tooth sets within each leg amounts to an integer number of half steps plus a fraction of a half step of the scale.

8. Apparatus according to claim 1 wherein the tooth sets of each leg are placed side by side across the scale; there being provided on the scale two separate rows of magnetic discontinuities cooperating with said sets.

9. Apparatus according to claim 8 wherein the teeth of each pair of sets in each leg of the head are arranged registering with each other; said two rows of discontinuities differing in space phase relation by one-half of a step of the scale.

10. Apparatus according to claim 1 wherein the tooth sets of each leg are arranged in a series along the longitudinal direction of the scale, and said scale comprises a single row of magnetic discontinuities cooperating with said tooth sets.

11. Apparatus according to claim 10 comprising a common driving winding means for said legs.

12. Apparatus according to claim 2 comprising separate driving winding means for said legs.

13. Apparatus according to claim 12 comprising separate alternating current driving coils surrounding respectively the two tooth sets forming each leg; said two tooth sets being arranged substantially parallel.

14. Apparatus according to claim 13 comprising two pairs of magnetic poles, each pole magnetically connected to one of said tooth sets, each pole being substantially of the same overall width in the longitudinal direction of said scale as the aggregate width of all the teeth in an associated set in said direction, and the poles of the pair of tooth sets on each leg being arranged on opposite sides of said pair of tooth sets, and adjacent to diametrical portions of the associated driving coil.

15. Apparatus according to claim 14 wherein each of said pairs of tooth sets and its associated pole form a separate magnetic flux circuit consisting of a number of single magnetic laminations mounted to form a single mechanical unit.

16. Apparatus according to claim 14 wherein each said pairs of tooth sets and its associated pole form a substantially separate magnetic flux circuit; the two circuits including a number of common magnetic laminations so cut as to be substantially inoperative as a magnetic conductor.

17. In combination, a magnetic head and a magnetic scale bar, said head being arranged for relative movement in the direction of the elongation of said bar; said head and scale bar forming a closed magnetic circuit; said scale bar having arranged thereon extending in the direction of its elongation equally spaced magnetic discontinuities, and said head having legs arranged spaced from each other at different parts of the longitudinal extension of said bar; each leg being provided with teeth facing said discontinuities; the tooth spacings within each leg differing in space phase relation to said discontinuities by a fraction of the spacing between said discontinuities, and the teeth of one leg collectively also differing in space phase relation from those of the other leg by a fraction of the spacing between said discontinuities; and winding means surrounding said different legs for deriving therefrom under control of said relative displacements, phase displaced electrical values representing quantities of said relative movement.

18. An arrangement according to claim 17 wherein each leg includes tooth sets arranged parallel to each other, and to the longitudinal axis of said scale bar, and wherein said scale bar has several parallel rows of discontinuities facing said parallel tooth sets.

19. An arrangement according to claim 18 wherein said winding means include winding means surrounding each of said sets of teeth.

20. An arrangement according to claim 18 wherein said winding means include winding means surrounding each of said sets of teeth, and additional winding means surrounding several of said tooth sets for energizing the entire arrangement.

21. In a displacement measuring apparatus, a magnetic scale bar having arranged thereon at least one longitudinal array of regularly spaced magnetic discontinuities, and a magnetic head arranged to be movable in the direction of said array and in close proximity to and forming a closed magnetic circuit with said scale bar; said magnetic head comprising at least two legs spaced from each other in the direction of the longitudinal extension of said array; each leg being provided with teeth facing said discontinuities and also spaced from each other in the direction of the longitudinal extension of said array; at least one set of teeth within each leg comprising teeth differing in space phase relation to said discontinuities; and at least one set of teeth of one leg differing in space phase relation to said discontinuities from a set of teeth of said other leg; winding means for energizing said two legs, and further winding means surrounding said tooth sets to produce signals phase shifted with respect to each other under control of the position of said teeth with respect to said discontinuities.

22. Apparatus according to claim 21 wherein said energizing winding means includes a winding surrounding each leg.

23. Apparatus according to claim 21 comprising a magnetic bridge connecting said legs, and wherein said energizing winding means includes a winding surrounding said bridge.

References Cited in the file of this patent

UNITED STATES PATENTS

| | | |
|---|---|---|
| 2,550,427 | Potts | Apr. 24, 1951 |
| 2,808,650 | Kumagai | Oct. 8, 1957 |
| 2,845,710 | Claret et al. | Aug. 5, 1958 |
| 2,848,698 | Howey et al. | Aug. 19, 1958 |